(12) United States Patent
Song et al.

(10) Patent No.: US 7,284,143 B2
(45) Date of Patent: Oct. 16, 2007

(54) SYSTEM AND METHOD FOR REDUCING CLOCK SKEW

(75) Inventors: James S. Song, Plano, TX (US); Achuta R. Thippana, Plano, TX (US); Minh G. Chau, Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 427 days.

(21) Appl. No.: 10/750,607

(22) Filed: Dec. 29, 2003

(65) Prior Publication Data

US 2005/0144497 A1    Jun. 30, 2005

(51) Int. Cl.
G06F 1/04 (2006.01)
G06F 1/24 (2006.01)
G06F 11/00 (2006.01)

(52) U.S. Cl. ............... 713/503; 713/400; 713/401; 713/500; 713/501; 377/106; 327/141; 327/144; 327/152; 327/297; 327/298

(58) Field of Classification Search ........ 713/400–601; 377/106; 327/141, 144, 152, 297, 298
See application file for complete search history.

(56) References Cited

U.S. PATENT DOCUMENTS

| | | | | |
|---|---|---|---|---|
| 5,517,109 A | * | 5/1996 | Albean et al. | 324/158.1 |
| 5,553,276 A | * | 9/1996 | Dean | 713/500 |
| 5,684,418 A | * | 11/1997 | Yanagiuchi | 327/99 |
| 6,429,714 B1 | * | 8/2002 | Schultz | 327/291 |
| 6,501,311 B2 | * | 12/2002 | Lutkemeyer | 327/161 |
| 6,549,045 B1 | * | 4/2003 | Wang et al. | 327/115 |
| 6,564,329 B1 | * | 5/2003 | Cheung et al. | 713/322 |
| 6,618,283 B2 | * | 9/2003 | Lin | 365/141 |
| 6,911,856 B2 | * | 6/2005 | Florescu | 327/250 |
| 7,120,844 B2 | * | 10/2006 | Wu | 714/731 |
| 2003/0135836 A1 | * | 7/2003 | Chang et al. | 716/11 |
| 2003/0146777 A1 | * | 8/2003 | Nadeau-Dostie et al. | 326/93 |

* cited by examiner

*Primary Examiner*—Rehana Perveen
*Assistant Examiner*—James F. Sugent
(74) *Attorney, Agent, or Firm*—Steven A. Shaw; W. James Brady; Frederick J. Telecky, Jr.

(57) ABSTRACT

In one embodiment, a method for balancing clock signals in a clock tree includes, at a register, receiving a divided input clock signal and a non-divided input clock signal and generating a first output clock signal based on the received divided input clock signal and the received non-divided input clock signal, the first output signal being associated with a first delay. The method further includes, at a delay line, receiving the non-divided input signal, delaying the non-divided input signal for a time substantially equivalent to the first delay, and generating a second output clock signal associated with a second delay substantially equal to the first delay. The method further includes: (1) receiving at a multiplexer the first output signal, the second output signal, and a select control signal indicating which of the first output signal or the second output signal to select; (2) selecting at the multiplexer either the received first output signal or the second output signal based on the select control signal; and (3) generating the selected first output signal or second output signal as a substantially balanced third output signal.

16 Claims, 4 Drawing Sheets

SYSTEM AND METHOD FOR REDUCING CLOCK SKEW

TECHNICAL FIELD

This invention relates generally to integrated circuits, and more particularly to a system and method for reducing clock skew.

BACKGROUND

Integrated circuits typically operate based on a reference clock. The clock may be distributed to the various devices that utilize the clock. Clock distribution and balancing are generally important in certain integrated circuit designs. For example, clock distribution and balancing may be important in large, high performance, low power application specific integrated circuit (ASIC) designs. A clock tree may provide a representation of clock distribution and may be useful in balancing the clocks of the clock tree.

Clock skew generally includes a clock phase delay difference between two or more points in a clock tree. Clock skew may be desirable in certain integrated circuits. For example, clock skew may allow a circuit designer to borrow time from non-critical paths to meet timing of critical paths, by increasing the effective clock cycle time for example. As another example, clock skew may reduce voltage drop and electromagnetism caused by simultaneous clock switching. However, it is typically desirable to reduce or eliminate clock skew because clock skew may degrade design speed and cause malfunctions due to hold time violations. For example, thousands of hold time violations may result from a mere 100 ps increase in clock skew. Clock skew may also cause setup time violations on critical paths of the clock tree when the clock skew reduces the effective clock period. In ASIC designs, it may be desirable to control clock skew to be less than the register hold time constraints defined in a cell library. This may allow the registers to be connected to each other, such as in scan chains, without hold time violations.

Clock skew may be reduced or eliminated by balancing the clocks in a clock tree for a particular clock distribution. Current solutions for clock balancing generally require clocks to be balanced manually. For a device that includes approximately 600,000-700,000 flip-flops, for example, it could take several months to manually balance the clocks. Current clock tree synthesis (CTS) tools such as the APOLLO CTS may be used to automatically balance clocks; however, these CTS tools may lack a desired level of intelligence and may only be able to balance one path or one set of paths. Furthermore, the APOLLO CTS tool can only balance a single mode of operation. In general, CTS tools are unsatisfactory when the clock structure is complex, implements intensive clock-gating logic, or implements multiple modes of clock distribution.

SUMMARY OF THE INVENTION

According to the present invention, disadvantages and problems associated with previous techniques for reducing clock skew may be reduced or eliminated.

In one embodiment, a method for balancing clock signals in a node of a clock tree includes, at a register: (1) receiving a divided input clock signal and a non-divided input clock signal; and (2) generating a first output clock signal based on the received divided input clock signal and the received non-divided input clock signal, the first output clock signal being associated with a first delay. The method further includes, at a delay line: (1) receiving the non-divided input clock signal; (2) delaying the non-divided input clock signal for a time substantially equivalent to the first delay; and (3) generating a second output clock signal associated with a second delay substantially equal to the first delay. The method further includes: (1) receiving at a multiplexer the first output clock signal, the second output clock signal, and a select control signal indicating which of the first output clock signal or the second output clock signal to select; (2) selecting at the multiplexer either the received first output clock signal or the second output clock signal based on the select control signal; and (3) generating the selected first output clock signal or second output clock signal as a substantially balanced third output clock signal.

In one embodiment, a method for balancing one or more clock signals in a clock tree having a multi-mode clock distribution includes: (1) associating a first delay equalizer with at least one of a plurality of clock-gating cells arranged in one or more levels in the clock tree, the first delay equalizer operable to provide a balanced input clock signal to the clock-gating cell such that an output clock signal generated by the clock-gating cell is substantially balanced; and (2) associating a second delay equalizer with each of one or more clock-dividing and selection modules in the clock tree, the delay equalizer operable to substantially balance the one or more clock signals between one or more functional modes. The method further includes: (1) extracting a common clock distribution topology from the clock tree, the topology accounting for substantially all of modes and clock-dividing paths of the topology; (2) determining one or more clock paths to be balanced, each comprising a multi-mode dependant clock path; (3) analyzing any local clock paths that were left out of the common clock distribution topology; (4) developing a local balancing strategy for the local clock paths that were left out of the common clock distribution topology to determine one or more constraints for substantially balancing the local clock paths; and (5) combining the local balancing strategy with the common clock distribution to form a clock tree synthesis constraint to substantially balance the common clock distribution topology and the local clock paths in a substantially automatic process.

Particular embodiments of the present invention may provide one or more technical advantages. In certain embodiments, the present invention may help in substantially balancing the clocks of a clock structure of an ASIC or other suitable circuit. For example, in certain embodiments, the present invention may improve clock balancing of a complex clock structure in a large, high performance, and low power ASIC. In certain embodiments, the present invention may help automate the clock balancing process by reducing or eliminating certain manual balancing steps. In certain embodiments, the present invention may allow multiple paths in a clock tree to be substantially balanced, taking into account multiple modes of clock distribution. As a result, in certain embodiments, the present invention may help reduce design cycle time.

In certain embodiments, because the clock paths that have the most impact on the entire clock balance have been extracted and substantially balanced and because the clock-dividing paths, clock-gating cells, and inverting and non-inverting switching paths have been substantially balanced using any suitable number combination of delay equalizers and an XNOR, the number of non-common clock distribution paths that require manual tuning may be minimized. This may help reduce or eliminate design cycles in balancing the clock tree of a particular device, while also reducing or eliminating clock skew in the clock tree.

Certain embodiments of the present invention may provide some, all, or none of the above technical advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

Figure 1:
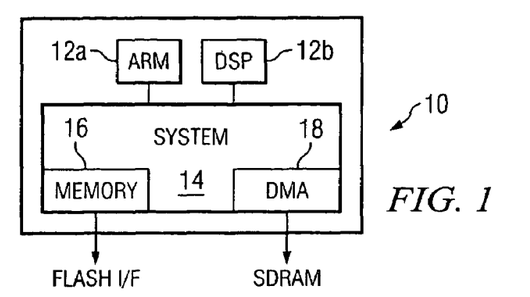
FIG. 1 illustrates an example electronic device architecture.

FIG. 1 illustrates an example electronic device architecture 10. In one embodiment, architecture 10 includes one or more core processors 12. As an example, core processor 12a may include a reduced instruction set computer (RISC) processor used for processing such as may be associated with functions such as personal digital assistant (PDA) functions, and core processor 12b may include a digital signal processor (DSP) used for substantially real-time processing such as may be associated with functions such as videoconferencing functions. In one embodiment, core processors 12a and 12b may operate at approximately 230 mHz and approximately 200-230 mHz, respectively. Core processors 12 may include embedded core processors. Clock balancing may be especially complex in low power ASICs and configurable embedded core processor designs. Embedded cores are typically the building blocks for system on chip (SoC) designs. The embedded cores are typically configurable in function and support various test, emulation, and debug operations. Recently, ASIC designs have become increasingly popular, often supporting various standard devices in a plug-in fashion. This may require a highly configurable clock network supporting various clock frequencies. As a result, core processors 12 and platform ASIC designs typically implement a clock structure, which may be complex.

In one embodiment, core processors 12 share system resources 14 coupled to core processors 12. System resources 14 may include a memory interface 16 and direct memory access (DMA) interface 18. For example, memory interface 16 may provide a flash memory interface that operates at approximately 50-100 mHz, and DMA interface 18 may provide a synchronous dynamic random access memory (SDRAM) interface that operates at approximately 100-166 mHz.

Architecture 10 may be associated with one or more operating modes. For example, the operating modes may include one or more functional modes and one or more test modes. A functional mode is typically determined at run time based on user operation of a device incorporating architecture 10. Choosing the functional mode based on operation of the device may include a tradeoff between speed (i.e. performance) and power. For example, if the user is operating the device using core processor 12a, it may be desirable to shut down or slow down core processor 12b to save power. As another example, if the user is operating the device using core processor 12b, it may be desirable to shut down or slow down core processor 12a to save power. The tradeoff between speed and power may be determined based on the functional mode selected. A test mode may be used to test a device. For example, a test mode may be used to test a device incorporating architecture 10 before it is released into the marketplace.

Each of the components of architecture 10 may operate based on one or more clocks. According to the example operating speeds described above, core processors 12 operate at faster speeds than memory interface 16 and DMA interface 18, and core processor 12b may operate at a faster speed than core processor 12a. This variance in speed may make it desirable for certain components of architecture 10 to operate at different clock frequencies, during different modes for example. It may be desirable to uncouple core processor 12a, core processor 12b, and system component 14 in terms of clock frequencies to enable a user or programmer to configure the device to provide desired levels of power and speed. For example, it may be desirable to make the clock frequencies for core processors 12a and 12b and system interface 14 configurable. The use of different clock frequencies may introduce or increase clock skew into architecture 10. It may be desirable to balance the various clocks of architecture 10 to reduce or eliminate this clock skew.

As an example, clock skew may be reduced or eliminated by balancing the clocks in a clock tree for a particular clock distribution. Current solutions for clock balancing generally require clocks to be balanced manually. For a device that includes approximately 600,000-700,000 flip-flops, for example, it could take several months to manually balance the clocks. Current clock tree synthesis (CTS) tools such as the APOLLO CTS may be used to automatically balance clocks; however, these CTS tools may lack a desired level of intelligence and may only be able to balance one path or one set of paths. Furthermore, the APOLLO CTS tool can only balance a single mode of operation. In general, CTS tools are unsatisfactory when the clock structure is complex, implements intensive clock-gating logic, or implements multiple modes of clock distribution.

Figures 2, 3A:
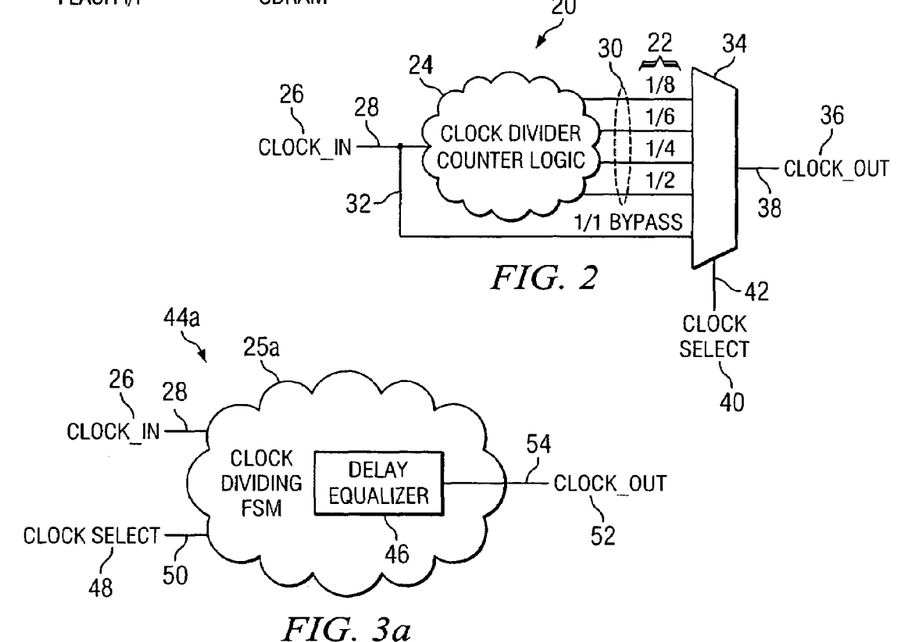
FIG. 2 illustrates example clock-dividing and selection logic, which includes multiple clock-dividing paths.
FIGS. 3A and 3B illustrate example clock-dividing and selection modules in which a delay equalizer is implemented to substantially balance one or more clock-dividing paths and non-dividing paths

FIG. 2 illustrates example clock-dividing and selection logic 20, which includes multiple clock-dividing paths 22. Clock-dividing and selection logic 20 may be implemented in an ASIC to generate clocks of various frequencies, for different peripherals or bus interfaces for example. Certain low power ASIC designs may allow one or more configurable clock controllers, such as clock-dividing and selection logic 20, to be used to provide appropriate frequency and power for a particular functional mode. As an example, an ASIC design may include nine clock-dividing paths 22. In this example, three of the clock-dividing paths 22 may produce user-configurable clocks to a DSP core, a multi-processor unit (MPU) core, and an internal traffic controller, for example, to enable each of these components to operate synchronous-scalable or asynchronously at their appropriate frequency. The remaining six clock-dividing paths 22 may be implemented such that the user can program the clock speed for various devices that may be plugged into the ASIC.

Clock-dividing and selection module 20 may include a clock-divider counter logic (CLKDIV) 24, which may divide a clock_in signal 26 received on a path 28 and generate divided clock signals 30 having various frequencies on clock-dividing paths 22. Although an CLKDIV 24 is primarily described, clock-dividing and selection module 20 may include any suitable component for generating clock signals. A non-dividing path 32 may be used for the non-divided clock signal. Non-dividing path 32 may also be referred to as a bypass path 32, since it bypasses the dividing logic of clock-dividing CLKDIV 24.

In one embodiment, each clock-dividing path 22 is associated with a different functional mode, meaning that each functional mode may operate at a different clock frequency. Although particular clock frequency divisions for clock-dividing paths 22 are illustrated (i.e. ½, ¼, ⅙, and ⅛), the present invention contemplates any suitable clock frequency divisions according to particular needs. Clock-dividing and selection module 20 may include a multiplexer 34, which may select one of the divided clock signals 30 on clock-dividing paths 22 generated by clock-dividing CLKDIV 24 or one the non-divided clock_in signal 26 received on path 32 to become a clock_out signal 38 on path 36. For example, multiplexer 34 may select one of the clock-dividing paths 22 based on a clock_select signal received on a clock_select signal 40 received on path 42.

During clock tree synthesis, current CTS tools may balance the clock tree through a particular clock-dividing path 22. However, balancing the particular clock-dividing path 22 with the other clock-dividing paths 22 cannot be guaranteed using these CTS tools. Moreover, in an embodiment in which multiplexer 34 is a high fan-in multiplexer, multiplexer 34 may exhibit large propagation delay variations from inputs (i.e. divided clock signals 30 on paths 22) to outputs (i.e. clock_out signal 36 on path 38) in clock-dividing CLKDIV 24 paths. This propagation delay variation may add additional clock skew among individual paths within multiplexer 34, which may be a source of clock skew in an integrated circuit.

Figure 3B:
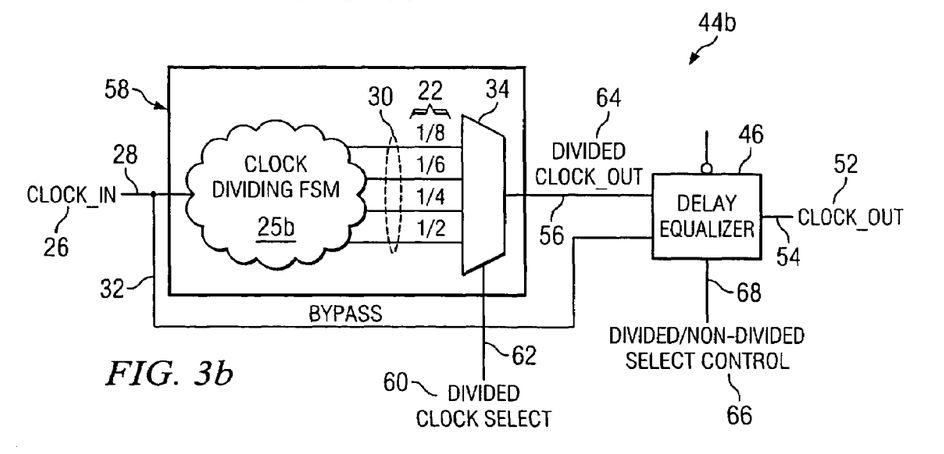

FIGS. 3A and 3B illustrate example clock-dividing and selection module 44a and 44b, respectively, in which a delay equalizer 46 is implemented to substantially balance one or more clock-dividing paths 22 and non-dividing paths 26. As illustrated in FIG. 3A, example clock-dividing and selection module 44b includes a delay equalizer 46 implemented as a final stage register of a clock-dividing finite state machine (FSM) 25a. Clock-dividing FSM 25a may receive clock_in signal 26 on path 28. Clock-dividing FSM 25a may receive a clock_select signal 48 on a path 50.

Clock-dividing FSM 25a may determine the clock frequency by performing appropriate clock-dividing processing on clock_in signal 26 received on path 28. However, a register in delay equalizer 46 may generate a divided clock__out signal 52 on a divided clock_out path 54. As a result, in certain embodiments, a clock may be distributed only through substantially balanced clock dividing paths 22 and non-dividing paths 32 in delay equalizer 46, which may help reduce or eliminate clock skew for different clock-dividing paths 22 and non-dividing paths 32. As an example, clock-dividing FSM 25a may received clock_in signal 26 on path 28 and clock_select signal 48 on path 50. Clock-dividing FSM 25a may perform appropriate clock-dividing processing on the received clock_in signal 26. A register of delay equalizer 46 may generate a divided clock_out signal 52 on divided path 54 that is substantially balanced. In one embodiment, clock_out signal 52 may be exactly balanced or may be balanced within a tolerance range suitable for a particular device.

As illustrated in FIG. 3B, example clock-dividing module 44b includes delay equalizer 46 implemented as a synchronizer. In this embodiment, delay equalizer 46 may be inserted at a divided clock_out path 56 of clock-dividing and selection module 58. As an example, clock-dividing FSM 25b may receive clock_in 26 signal on path 28. Clock-dividing FSM 25b may perform appropriate clock-dividing processing on received clock_in signal 26 to generate divided clock signals 30 on clock-dividing paths 22. Multiplexer 34 may receive divided clock signals 30 on clock-dividing paths 22 and a divided clock select signal 60 on a path 62, and may generate a divided clock_out signal 64 on path 56 based at least on these inputs.

Delay equalizer 46 may receive the generated divided clock_out signal 64 on path 56. Delay equalizer 46 may also receive a non-divided clock_in signal 26 on non-dividing path 32 (e.g., the bypass signal). Delay equalizer 46 may also receive a divided/non-divided select signal 66 on a path 68, which delay equalizer 46 may use to determine whether to select divided clock_out signal 64 received on path 56 or non-divided clock_in signal 26 received on non-dividing path 32. Delay equalizer 46 may generate a clock_out signal 52 on a path 54 based on the received inputs. Clock_out signal 52 on path 54 may be substantially balanced. In one embodiment, clock_out signal 52 may be exactly balanced or may be balanced within a tolerance range suitable for a particular device.

This implementation may help isolate clock-dividing and selection module 58 from the selection of a divided clock signal 30 based on divided clock select signal 60, by using delay equalizer 46. This isolation may help reduce the dependency of divided clock_out signal 64 (on path 56) on divided clock select signal 60 (on path 62) and may also reduce or eliminate the clock skew between divided clock signals 30 on paths 22, as well as non-divided clock_in signal 26 on non-dividing path 32.

Figure 4:
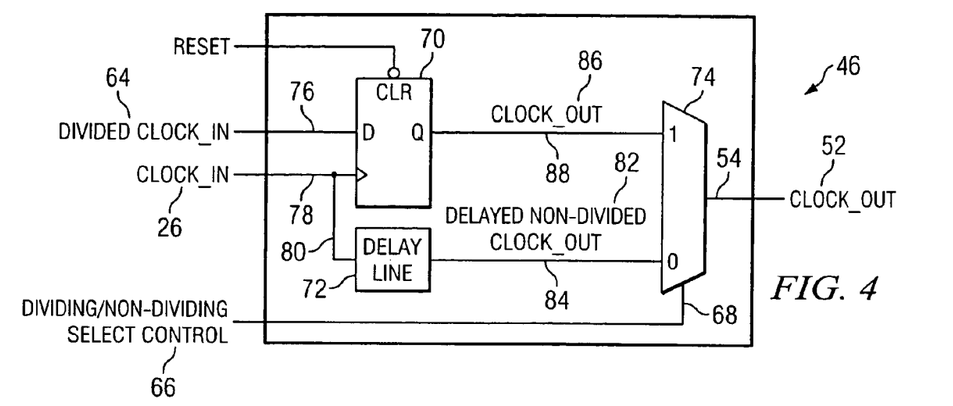
FIG. 4 illustrates an example delay equalizer, which may be used to balance one or more divided clock_out signals received on a path.

FIG. 4 illustrates an example delay equalizer 46, which may be used to balance one or more divided clock_out signals 64 received on path 56. Because clock skew associated with clock-dividing paths 22 may be introduced by delay variations in clock-dividing paths 22 and the use of large fan-in multiplexers 26, delay equalizer 46 may be used to help balance clock-dividing paths 22. Delay equalizer 46 may include a register 70, a delay line 72, and a multiplexer 74. In one embodiment, register 70 may include a flip-flop or a latch. In one embodiment, delay line 72 includes one or more buffers. Delay equalizer 46 includes path 76 for receiving divided clock_out signal 64 from path 56. Delay equalizer 46 includes a path 78 for receiving non-divided clock_in signal 26, from non-dividing clock_in path 32 for example. Delay equalizer 46 includes a delay line path 80 leading to delay line 72, which may be used to substantially balance the divided clock_in signal 64 with the non-divided clock_in signal 26. Delay line 72 may generate a delayed non-divided clock_out signal 82 on path 84.

Register 70 may receive divided clock_in signal 64 on path 76 and non-divided clock_in signal 26 on path 78. Register 70 may perform any suitable processing on the divided and non-divided clock_in signals 64 and 26 to generate a clock_out signal 86 on clock_out path 88. The processing performed by register 70 may be associated with a clock-to-output delay, which may be any suitable length of time according to particular needs or configurations. Non-divided clock_in signal 26 received by delay equalizer 46 may also be received by delay line 72 via path 80 and processed by delay line 72.

Delay line 72 may, through the use of buffers or other suitable components, balance non-divided clock_in signal 26 with the processing of the non-dividing and dividing clock signals 26 and 64 in register 70, based at least in part on the clock-to-output delay of register 70. For example, delay line 72 may delay non-divided clock_in signal 26 received on path 80 a length of time substantially equal to the clock-to-output delay of register 70. In certain embodiments, it may not be possible for delay line 72 to match the clock-to-output delay exactly; however, in such embodiments, delay line 72 may match the clock-to-output delay within certain margins. The clock-to-output delay of register 70 may be a known value because particular register designs may have a particular clock-to-output delay. For example, the clock-to-output delay may be known for a particular ASIC design. Thus, in delay equalizer 46, the following two paths are substantially balanced: (1) the path from divided clock_in path 76 and non-divided clock_in path 78 to clock_out path 88 through register 70; and (2) the path from path 78 to path 80 and through delay line 72.

In one embodiment, output multiplexer 74 may isolate register 70 and delay line 72 from external loads to help ensure that the balance between register 70 and delay line 72 will not vary with the external load. Output multiplexer 74 may select between clock_out signal 86 received on path 88 and the delayed non-divided clock_out signal 82 received on path 84. For example, output multiplexer 74 may receive a dividing/non-dividing select control signal 66 on path 68 for determining whether to select clock_out signal 86 from path 88 or the delayed, non-divided clock_out signal 82 from path 84. Based on the selection, multiplexer 74 may generate substantially balanced clock out signal 52 on path 54. Thus, substantially balanced clock_out signal 52 may be either the divided clock_out signal 86 on path 88 or the delayed, non-divided clock_out signal 82 from path 84.

Figure 5:
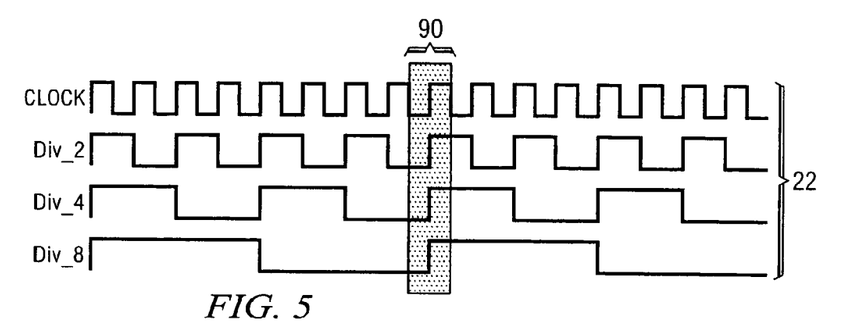
FIG. 5 illustrates an example substantially error-free dividing/non-dividing select control signal switching timing requirement.

In one embodiment, dividing/non-dividing select control signal 66 may be generated by the configuration of an application after power-on of a device. In this embodiment, dividing/non-dividing select control signal 66 may be generated as a static signal, and there may be substantially no constraints on dividing/non-dividing select control signal 66. In another embodiment, dividing/non-dividing select control signal 66 may be programmed on the fly (e.g., generated at run time by an application). In this embodiment, it may be necessary to ensure that the dividing/non-dividing select control signal 66 does not cause an error in clock distribution. Thus, it may be necessary to apply one or more constraints to the dividing/non-dividing select control signal 66. For example, a constraint may include switching the dividing/non-dividing select control signal 66 only when clock dividing paths 22 have the same phase. This may be accomplished by designing the control logic to ensure that the dividing/non-dividing select control signal 66 switches only in a common clock phase across the synchronous edge of all clock dividing paths 22, as shown in FIG. 5 for example. FIG. 5 illustrates an example substantially error-free dividing/non-dividing select control signal 66 switching timing requirement. In FIG. 5, area 90 indicates an example safe switching time window.

Figure 6:
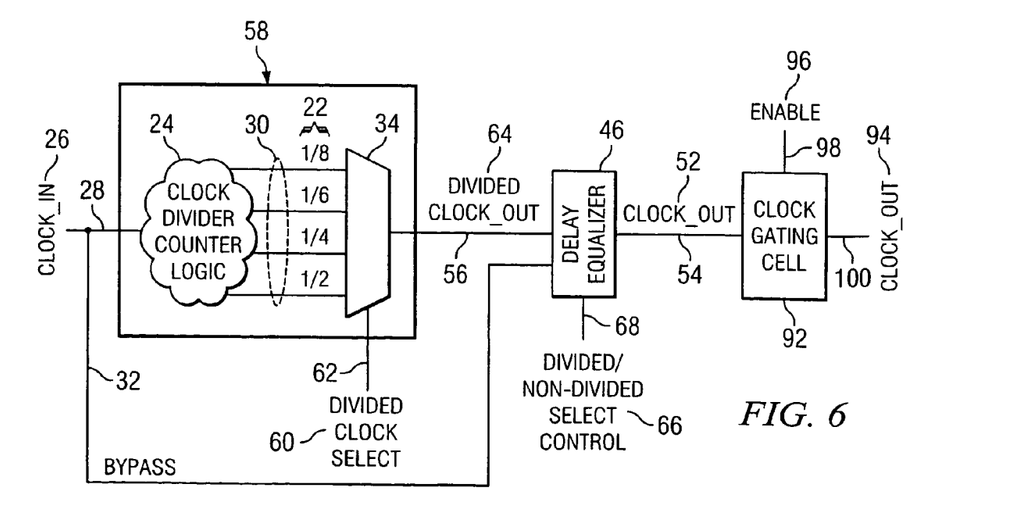
FIG. 6 illustrates an example embodiment in which the delay equalizer is implemented to substantially balance an output clock signal generated by a clock-gating cell.

FIG. 6 illustrates an example embodiment in which delay equalizer 46 is implemented to substantially balance an output clock signal generated by a clock-gating cell 92. In one embodiment, delay equalizer 46 may receive divided clock_out signal 64 on path 56 from clock-dividing and selection module 58 and may receive non-divided clock signal 26 on path 32. As described above, delay equalizer 46 may generate a substantially balanced clock_out signal 52 on path 54. Delay equalizer 46 may provide this substantially balanced clock_out signal 52 to associated clock-gating cell 92 as an input clock signal to clock-gating cell 92. Clock-gating cell 92 may also receive an enable signal 96 on a path 98, and may generate a substantially balanced clock_out signal 94 on a path 100 based on the received substantially balanced clock_in signal (i.e. clock_out signal 52) and enable signal 96. In one embodiment, because the received clock_in signal (i.e. clock_out signal 52) is substantially balanced (i.e. by delay equalizer 46), clock_out signal 94 generated by clock-gating cell 92 is substantially balanced. Low power ASICs commonly implement complex clock structures to enable efficient clock gating of idle blocks at various levels in various modes, such as functional mode and test mode. Using a delay equalizer 46 in conjunction with a clock-gating cell 92 may help reduce power consumption in a device.

Figure 7:
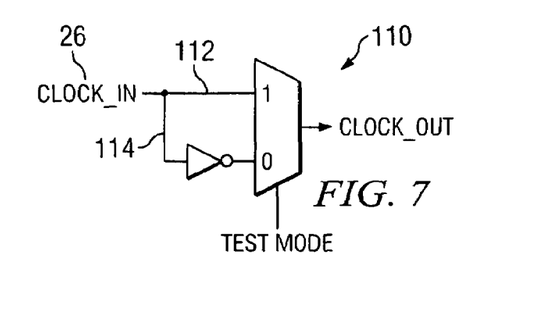
FIG. 7 illustrates an example inverter.

FIG. 7 illustrates an example inverter 110. Inverted clocks are frequently used in ASIC or other circuit designs, for example, to drive a positive edge triggered register rather than a negative edge triggered register. Inverted clocks may improve performance or design-for-testing (DFT) convenience, for example. Positive edge triggered registers are typically clocked using non-inverting test clocks in test mode.

Inverter 110 may be used to drive a positive edge triggered register. In one embodiment, inverter 110 includes a non-inverting path 94 for receiving a clock_in signal 26, which may be selected when in test mode, and an inverting path 114, which may be selected when in functional mode. Inverter 110 may cause problems such as clock skew within system 10. In functional mode, clock_in signal 26 may need to be inverted on inverting path 114. Current CTS tools can only balance one of the clock paths (non-inverting path 112 or inverting path 114) to the same set of registers. Thus, the unbalanced path (either inverting path 114 or non-inverting path 112) may cause clock skew between non-inverting path 112 and inverting path 114 to these registers. However, it may be desirable to balance both non-inverting path 112 and inverting path 114 to these registers.

Figure 8:
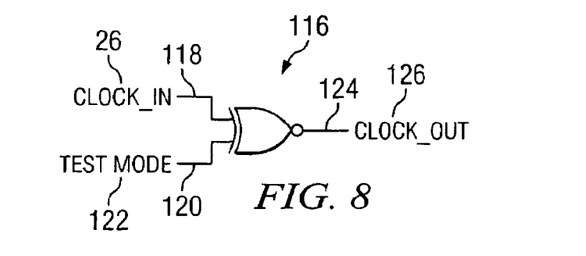
FIG. 8 illustrates an example exclusive-NOR (XNOR) gate, which may be used to balance both a non-inverting path and an inverting path to one or more registers.

FIG. 8 illustrates an example exclusive-NOR (XNOR) gate 116, which may be used to balance both non-inverting path 112 and inverting path 114 to one or more registers. XNOR gate 116 may include a path 118 for receiving clock_in signal 26. XNOR gate 116 may also include a path 120 for receiving a test mode signal 122 and a path 124 for transmitting a clock_out signal 126 from XNOR gate 116.

XNOR gate 116 may generate a non-inverting clock_out signal 126 on path 124 when test mode is asserted on path 120. The incoming test mode signal 122 on path 120 may be a non-inverted clock signal. Using XNOR gate 116, both inverting and non-inverting clock signals pass through the same gate (XNOR gate 116), which may substantially equalize inverting and non-inverting path delays. If the standard XNOR gate in the ASIC cell library exhibits large rise and fall variation, then a new XNOR gate 116 may be designed to minimize the delay variation. For example, it may be necessary for the delay from path 118 to path 124 to be the same (1) regardless of whether the incoming test mode signal 122 on path 120 is high or low; and (2) regardless of whether clock_out signal 126 on path 124 from XNOR gate 116 is rising or falling.

Figure 9:
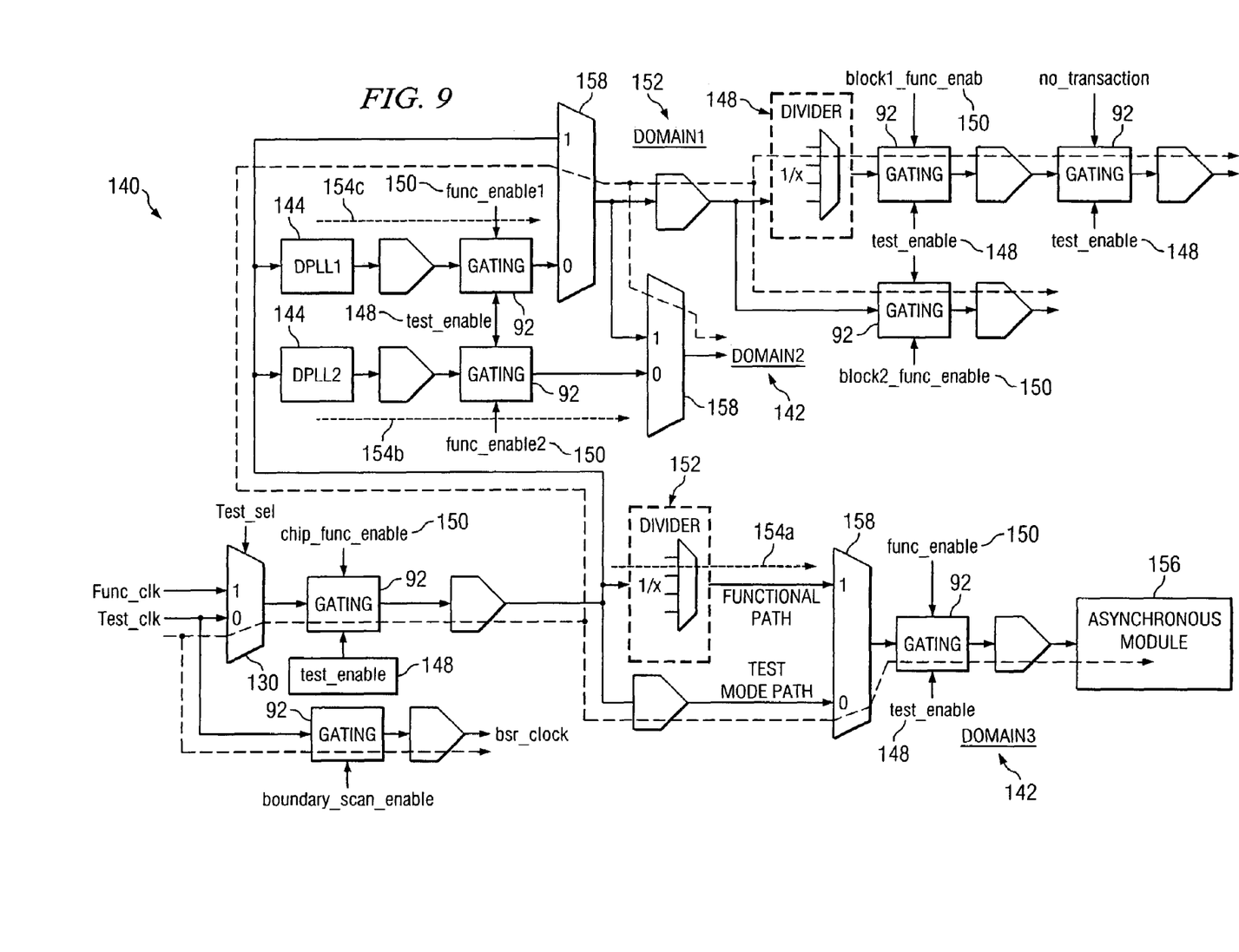
FIG. 9 illustrates an example clock balancing strategy for a clock tree having a multi-mode clock distribution.

FIG. 9 illustrates an example clock balancing strategy for a clock tree 140 having a multi-mode clock distribution. Although clock tree 140 is illustrated and described as having a particular configuration and including particular components, the present invention contemplates clock tree 140 having any suitable configuration and including any suitable components according to particular needs.

Clock tree 140 may include one or more domains 142. In the illustrated embodiment, clock tree 140 includes domain1, domain2, and domain3. In one embodiment, each domain 142 is associated with a core processor 12. For example, domain1 may be associated with core processor 12a and domain2 may be associated with core processor 12b. In one embodiment, clock tree 140 includes one or more digital phase-locked loop (DPLL) components 144, which may include an electronic circuit that controls an oscillator such that the oscillator maintains a constant phase angle (i.e. lock) on the frequency of an input or reference signal. A DPLL may help ensure that a communication signal is locked on a specific frequency and may also be used to generate, modulate, and demodulate a signal and divide a frequency. In the illustrated embodiment, clock tree 140 includes DPLL1 and DPLL2. Clock tree 140 may include one or more clock-gating cells 92, which may be used to selectively enable or disable a clock signal. In one embodiment, clock-gating cells 92 receive one or more of a test_enable 148 for enabling a test mode, a function_enable signal 150 for enabling a functional mode, or any other suitable signal for indicating an applicable mode. Clock tree 140 may also include one or more clock-dividing and selection modules 152, which may be used to select between one or more divided clock signals 30 on clock-dividing paths 22 for one or more functional modes.

Another source of clock skew may include operation mode dependent multiple clock distributions. For example, in a complex circuit design, a clock signal is often distributed through different paths in various operation modes. As described above, operation modes may include functional modes such as functional modes, test modes, or any other suitable modes of operation. Clock tree 140 is an example of such a circuit design. As an example, a clock for domain2 may be distributed from either DPLL1 in a fully synchronous functional mode or DPLL2 in other functional modes where the logic of domain1 and domain2 can run at different clock speeds for optimal performance and power consumption. In such multi-mode clock distributions, a good clock tree balance in one mode distribution does not necessarily guarantee a balance in another mode distribution. As a result, the unbalanced clock distribution paths for each mode may exhibit clock phase delay variation from a balanced clock distribution, which may result in operation mode dependant clock skew. In one embodiment, as the discrepancy in the clock distribution between modes of operation increases, the clock skew may increase.

As described above, clock balancing is typically challenging in large, high performance, low power ASIC designs due to the clock structure of multilevel clock-gating, which may be a complex clock structure, and various modes of clock distribution. Manual clock tree analysis and balancing methods may be unsuitable for ASIC designs because of certain constraints such as time-to-market. Thus, it may be desirable to use a clock balancing strategy to balance the complex clock structure (e.g., clock tree 140) in a substantially automatic fashion with minimal manual tuning.

According to the present invention, one or more of delay equalizer 46 and XNOR gate 116 may be used throughout clock tree 140 to help substantially automatically balance clock tree 140 and to reduce clock skew in clock tree 140. For example, a delay equalizer 46 may be associated with one or more clock dividing and selection modules 152. In one embodiment, one or more of the clock dividing and selection modules 52 are each associated with a delay equalizer 46 in a manner similar to that described with reference to clock dividing and selection module 44a in FIG. 3a. In one embodiment, one or more of the clock dividing and selection modules 152 are each associated with a delay equalizer 46 in a manner similar to that described with reference to clock dividing and selection module 44b in FIG. 3b. As another example, one or more clock-gating cells 92 are each associated with a delay equalizer 46 in a manner similar to that described with reference to FIG. 6. As another example, one or more XNOR gates 116 may be inserted throughout clock tree 140 to help substantially balance clock tree 140.

In clock tree 140, the common shared clock distribution paths are indicated by dashed lines. Clock tree 140 also includes three mode dependent local clock paths 154. Local clock path 154a of domain3 passes through clock dividing and selection module 152 and a particular functional mode is selected, for example. Local clock path 154a connects to an asynchronous module 156, the logic of asynchronous module 156 operating asynchronously with the rest of clock tree 140 in the particular functional mode. Thus, local path 154a may be defined as an individual clock and may, in the particular functional mode, be balanced independently of the rest of clock tree 140, with minimum insertion delay. Local paths 154b and 154c descend from DPLL1 and DPLL2 and operate in the particular functional mode, for example. Local paths 154b and 154c may need to be balanced to ensure that the clock phase delay of domain2 remains the same when the clock distribution changes from DPLL1 to DPLL2. In one embodiment, local paths 154b and 154c may be defined together as an individual clock group and balanced independently from the rest of the clocks in clock tree 140. Since the path from DPLL1 to domain2 includes one more multiplexer 158 than the path from DPLL2 to domain2, an offset constraint may be applied to the local path balance from DPLL1 to domain2. As a result, local paths 154b and 154c may be substantially balanced with equal clock phase delay at domain2.

Figure 10:
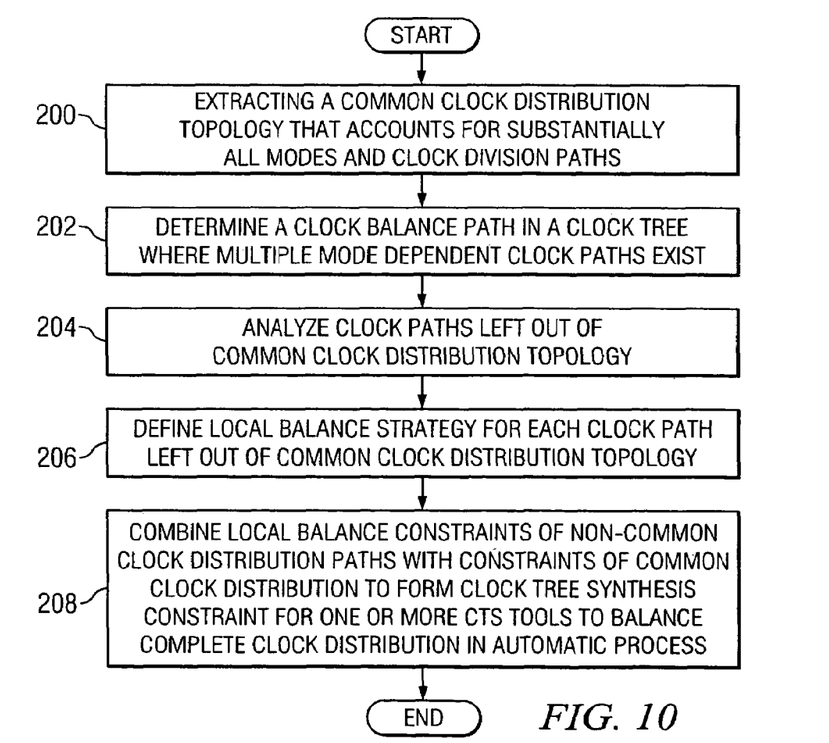
FIG. 10 illustrates an example method for balancing one or more clocks in a clock tree having a multi-mode clock distribution.

FIG. 10 illustrates an example method for balancing one or more clocks in a clock tree 140 having a multi-mode clock distribution. According to the example method illustrated in FIG. 10, manual clock balancing in a clock tree may be reduced or eliminated.

Previous techniques for reducing clock skew using a clock balancing strategy for multi-mode clock distribution may be unsatisfactory. According to one previous solution, a common shared clock distribution topology may be extracted from a clock tree, which may consider one or more modes and clock-dividing paths. In some cases, all modes and clock-dividing paths may be considered. When appropriate, clock dividing and selection module 148 may be considered part of clock tree 140. This technique may result in a maximum collection of the clock distribution paths for all modes, substantially lacking in ambiguity. The extracted clock distribution paths may be balanced as a single clock tree using CTS tools. Next, certain clock paths that may have been left out of the common clock distribution may be analyzed. A local balance strategy may be defined for each of these clock paths using one or more balanced constraints such as target constraints, offset constraints, or other suitable constraints. The constraints may be combined with the common clock distribution to form a clock balance constraint that the CTS tool can use to balance the complete clock distribution in an automated process.

According to the present invention, a common shared clock distribution topology may be extracted at step 200, which accounts for substantially all modes and clock division paths. One or more of clock-dividing and selection modules 158 may be considered part of the clock balance tree where appropriate. Because CTS tools generally cannot balance through ambiguous clock paths, a clock balance path in a clock tree may need to be determined where multiple mode dependent clock paths exist at step 202. The path may be determined by determining whether balancing of the clock path would have a predetermined impact on clock tree balance and device performance. For example, if a particular functional mode clock path drives a portion of the design that operates asynchronously to the rest of the design, then the clock balance of that portion of the design may not be critical. However, that portion of the design may need to be balanced in test mode, for scan shift and capture for example. Therefore, the test mode clock path may be chosen as the balance path in that case.

In another case, a particular functional mode clock path may drive a timing critical portion of the design and interact with the rest of the design synchronously with tight timing constraints. In that case, the particular functional mode clock path may be defined as the balance path. Thus, clock distribution modes may not have priority in the path selection. The particular functional mode clock path can be chosen as the balance path in a part of the clock structure and a scan mode clock path can be selected in another part of the clock structure. Typically, CTS tools do not treat clock paths of various modes differently during balancing of a clock tree. However, it may only be desirable to know which path has maximum impact on the clock tree balance and device performance. The result of this extraction may be a maximum collection of the clock distribution paths of all modes, substantially without ambiguity.

At step 204, the clock paths that were left out of the common clock distribution may be analyzed, and a local balance strategy for each of them may be defined at step 206. For example, if the logic of the non-common clock distribution path operates asynchronously with the rest of the design, the path may be defined as an independent local tree and use of one or more CTS tools may be constrained to expand and balance that path individually with minimum insertion delay. In another example in which a non-common clock distribution path needs to be balanced with the paths in the common clock distribution path, a balance target may be defined and use of one or more CTS tools may be confined to balancing the path as an individual clock tree at the defined target delay. The target delay may be calculated based on the result of the clock balance of the common clock distributions.

At step 208, the local balance constraints of the non-common clock distribution paths may be combined with the constraints of the common clock distribution to form a clock tree synthesis constraint for the one or more CTS tools to balance the complete clock distribution in an automatic process. Because the clock paths that have the most impact on the entire clock balance have been extracted and substantially balanced and because the clock-dividing paths, clock-gating cells, and inverting and non-inverting switching paths have been substantially balanced using any suitable number combination of delay equalizer 46 and XNOR gate 116, the number of non-common clock distribution paths that require manual tuning may be minimized. This may help reduce or eliminate design cycles in balancing the clock tree of a particular device, while also reducing or eliminating clock skew in the clock tree.

Although the method steps described with reference to FIG. 10 are described in a particular order, the present invention contemplates certain steps being performed in any suitable order according to particular needs.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A delay equalizer for balancing clock signals in a clock tree, comprising:
   a register operable to:
   receive a divided input clock signal;
   receive a non-divided input clock signal; and
   generate a first output clock signal based on the received divided input clock signal and the received non-divided input clock signal, the first output clock signal being associated with a first delay;
   a delay line operable to:
   receive the non-divided input clock signal;
   delay the non-divided input clock signal for a time substantially equivalent to the first delay associated with the first output clock signal; and
   generate a second output clock signal being associated with a second delay substantially equal to the first delay of the first output signal; and
   a multiplexer operable to:
   receive the first output clock signal and the second output clock signal;
   receive a select control signal indicating which of the first output clock signal or the second output clock signal to select, wherein the select control signal is programmable on the fly, and wherein the select control signal transitions only when the first output clock signal and the second output clock signal have the same phase;
   select either the received first output clock signal or the second output clock signal based on the select control signal; and
   generate the selected first output clock signal or second output clock signal as a substantially balanced third output clock signal.

2. The delay equalizer of claim 1, wherein:
   the divided input clock signal being associated with a functional mode of a device comprising the delay equalizer; and
   the select control signal received by the multiplexer comprises a divided/non-divided select control signal;
   the delay equalizer is operable to substantially balance an input clock signal between one or more functional modes of the device.

3. The delay equalizer of claim 2, wherein the delay equalizer is implemented at the output of existing clock dividing and selection logic.

4. The delay equalizer of claim 2, wherein the delay equalizer is implemented within existing clock dividing and selection logic, the clock dividing and selection logic being redesigned to include the delay equalizer.

5. The delay equalizer of claim 1, wherein the delay equalizer is associated with a clock-gating cell and is operable to provide the substantially balanced third output clock signal to the clock-gating cell as an input clock signal to the clock-gating cell such that an output clock signal generated by the clock-gating cell is substantially balanced.

6. The delay equalizer of claim 1, wherein:
the register comprises a flip-flop register; and
the delay line comprises one or more buffers for delaying the non-divided clock signal.

7. The delay equalizer of claim 1, wherein the select control signal transitions substantially coincident with a rising edge of the first output clock signal and a rising edge of the second output clock signal in the same phase.

8. The delay equalizer of claim 1, wherein the multiplexer is further operable to:
isolate the first output clock signal and the second output clock signal from a clock load.

9. A method for balancing clock signals in a node of a clock tree, comprising:
receiving a divided input clock signal at a register;
receiving a non-divided input clock signal at the register;
generating at the register a first output clock signal based on the received divided input clock signal and the received non-divided input clock signal, the first output clock signal being associated with a first delay; receiving the non-divided input clock signal at a delay line;
delaying at the delay line the non-divided input clock signal for a time substantially equivalent to the first delay associated with the first output clock signal;
generating at the delay line a second output clock signal being associated with a second delay substantially equal to the first delay of the first output signal;
receiving at a multiplexer the first output clock signal and the second output clock signal;
receiving at the multiplexer a select control signal indicating which of the first output clock signal or the second output clock signal to select, wherein the select control signal is programmable on the fly, and wherein the select control signal transitions only when the first output clock signal and the second output clock signal have the same phase;
selecting at the multiplexer either the received first output clock signal or the second output clock signal based on the select control signal; and
generating the selected first output clock signal or second output clock signal as a substantially balanced third output clock signal.

10. The method of claim 9, wherein:
the divided input clock signal being associated with a functional mode of a device comprising the delay equalizer; and
the select control signal received by the multiplexer comprises a divided/non-divided select control signal;
the method substantially balancing an input clock signal between one or more functional modes of the device.

11. The method of claim 10, wherein the method is performed on the output of existing clock dividing and selection logic.

12. The method of claim 10, wherein the method is integrated into existing clock dividing and selection logic, the clock dividing and selection logic having been redesigned for implementing the method.

13. The method of claim 9, further comprising providing the substantially balanced third output clock signal to a clock-gating cell as an input clock signal to the clock-gating cell such that an output clock signal generated by the clock-gating cell is substantially balanced.

14. The method of claim 9, wherein:
the register comprises a flip-flop register; and
the delay line comprises one or more buffers for delaying the non-divided clock signal.

15. The method of claim 9, wherein the select control signal transitions substantially coincident with a rising edge of the first output clock signal and a rising edge of the second output clock signal in the same phase.

16. The method of claim 9, wherein the multiplexer is further operable to:
isolate the first output clock signal and the second output clock signal from a clock load.

* * * * *